(No Model.)

C. S. HELLER.
NIPPLE.

No. 582,159. Patented May 4, 1897.

ATTEST
R. B. Moser
H. E. Mudra

INVENTOR
Charles S. Heller

By H. T. Fisher ATTY

UNITED STATES PATENT OFFICE.

CHARLES S. HELLER, OF AKRON, OHIO.

NIPPLE.

SPECIFICATION forming part of Letters Patent No. 582,159, dated May 4, 1897.

Application filed July 6, 1896. Serial No. 598,108. (No model.)

*To all whom it may concern:*

Be it known that I, CHARLES S. HELLER, a citizen of the United States, residing at Akron, in the county of Summit and State of Ohio, have invented certain new and useful Improvements in Nipples for Nursing-Bottles; and I do hereby declare that the following is a full, clear, and exact description of the invention, which will enable others skilled in the art to which it appertains to make and use the same.

My invention relates to nipples for nursing-bottles; and the invention consists, essentially, in a nipple so constructed that the flow of milk through the same cannot be cut off by bending or compressing the nipple, all as hereinafter more fully described, and particularly pointed out in the claims.

Figure 1:
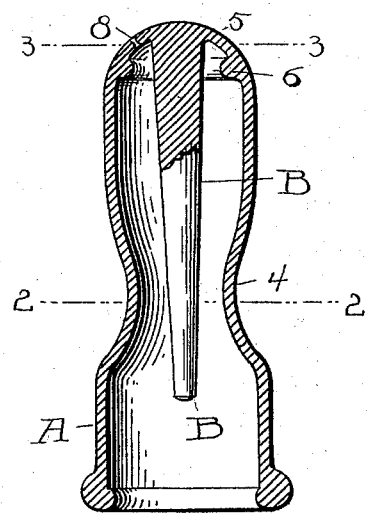
Figure 2:
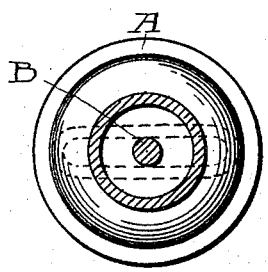
Figure 4:
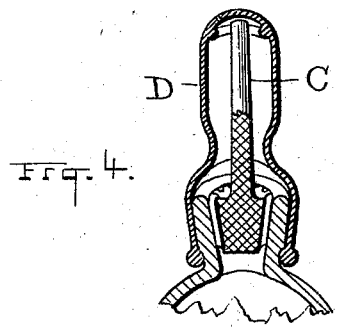
Figure 3:
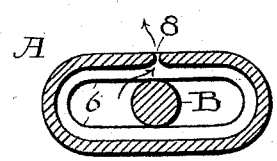

In the accompanying drawings, Figure 1 is a longitudinal sectional elevation of one form of nipple constructed according to my invention. Fig. 2 is a cross-section thereof on line 2 2, Fig. 1, and showing in dotted lines how total collapsing of the nipple is prevented by the central stem. Fig. 3 is a cross-section of the mouth of the nipple, disclosing the annular rib within the same and the relation of the parts to the stem when the nipple is compressed onto the stem. Fig. 4 shows a modification in which the stem is fixed in the mouth of the bottle and projects upward into the nipple, and is therefore separate therefrom.

A represents a rubber nursing-nipple, the exterior of which may be considered to be substantially the same as any well-known nipple in use, and adapted to be engaged over the mouth of a nursing-bottle. Internally the construction of the nipple is modified to overcome well-known objections to nipples as hitherto made. It is well known that frequently a child bends the nipple in its neck, so that the passage is entirely closed and no milk can flow. Again, it is also known that very frequently a nipple will collapse under suction and the sides be drawn so closely together as to prevent all flow of milk. These are common and serious objections which every one meets with who uses the plain nipple, and although various means have been resorted to from time to time to overcome these objections and to produce a popular nipple in which they are overcome it still remains true that people generally are using the plain nipple as heretofore, notwithstanding its well-known defects.

My invention therefore has in view a nipple which cannot be closed either by bending or collapsing, and to this end I show in Fig. 1 a form of nipple in which there is a stem B projecting centrally from the inside of the dome of mouth 5 of the nipple and terminating below its neck 4 and at about the point where the neck of the bottle is engaged. This leaves the lower end of the stem free, and the stem is shown also as tapered between its ends, though this is not material. With this construction if the nipple be bent at right angles or further at its neck 4 it cannot close any further than shown in dotted lines, Fig. 2, where the sides are kept apart by the stem B, which in any such case will determine their separation. That is, the thickness of the stem fixes the space between the sides of the nipple when bent, as disclosed in dotted lines, Fig. 2. Then to further protect the nipple from collapsing and to insure a free flow of milk, I form an annular bead or rib 6 within the mouth and about the base of the dome thereof below the outlet opening or openings 8. Among other advantages of this rib at this place is to prevent the hole 8 from being closed by the child's pressing it against the stem B when the sides of the mouth are pressed together, as seen in Fig. 3. If this rib or its equivalent were not here the hole 8 might be closed, but by this construction closing thereof is impossible by the child.

In Fig. 4 I show a modification in which the stem C is separate from the nipple D and projects into the nipple from the mouth of the bottle, in which it is supported by a fluted head, which allows a free flow of milk through its fluted side. This or any equivalent means of supporting the stem may be adopted.

In the form shown in Fig. 1 the nipple is reversed for cleansing in the usual way.

What I claim as new, and desire to secure by Letters Patent, is—

1. A nipple for nursing-bottles having a stem integral with the dome thereof and extending longitudinally through the nipple toward its open end, substantially as described.

2. A nursing-bottle nipple having a solid stem integral with the dome thereof and its free end projecting through the narrow portion of the nipple, substantially as described.

3. A nursing-bottle nipple having an annular bead within its dome and a central flexible stem integral with the dome at one end and free at the other end, substantially as described.

4. The nipple described having an annular bead in its dome and a solid tapered stem projecting from within said dome centrally of the nipple, substantially as described.

Witness my hand to the foregoing specification this 29th day of June, 1896.

CHARLES S. HELLER.

Witnesses:
T. W. WAKEMAN,
JOHN GOETHER.